United States Patent [19]

Moore

[11] 4,133,913
[45] Jan. 9, 1979

[54] METHOD FOR PROVIDING AUTOMOBILE DASHBOARDS AND THE LIKE WITH A TEXTURIZED FINISH

[75] Inventor: David R. Moore, San Diego, Calif.
[73] Assignee: Bruce R. Moore, Carlsbad, Calif.
[21] Appl. No.: 827,661
[22] Filed: Aug. 25, 1977
[51] Int. Cl.² .............................................. B32B 35/00
[52] U.S. Cl. ...................................... 427/140; 156/94; 156/98; 427/270; 427/355; 427/407 R; 427/407 C
[58] Field of Search ............... 427/140, 280, 270, 355, 427/407 R, 407 C; 156/94, 98; 428/63; 264/36; 260/31.2 R

[56] References Cited

U.S. PATENT DOCUMENTS

| | | | |
|---|---|---|---|
| 2,458,032 | 1/1949 | Simon et al. | 156/98 |
| 2,855,338 | 10/1958 | Mulkey | 156/94 |
| 2,934,510 | 4/1960 | Crissey et al. | 260/31.2 R |
| 3,060,148 | 10/1962 | Evans et al. | 260/31.2 R |
| 3,109,765 | 11/1963 | Petrowsky | 428/63 |
| 3,194,777 | 7/1965 | Christenson et al. | 260/31.2 R |
| 3,351,507 | 11/1967 | Schafer | 156/60 |
| 3,470,048 | 9/1969 | Jones | 156/94 |
| 3,920,497 | 11/1975 | Speer | 427/140 |

Primary Examiner—Michael F. Esposito
Assistant Examiner—Sadie L. Childs
Attorney, Agent, or Firm—Spensley, Horn & Lubitz

[57] ABSTRACT

This invention relates to a method for repairing plastic materials, and more specifically, automobile dashboards and the like. The method enables one to provide the repaired item with a texturized finish such that cracks, cuts, and other imperfections in the surface are completely covered in such a manner that the repaired item appears to take on the appearance of being new. The method comprises the steps of filling in cracks and other indentations with a hardenable filler such that a smooth surface is formed. A base coat of an acrylic resin is then applied over the surface followed by a texturized acrylic resin coating which forms a texturized finish on the surface. Depending on the original color of the item to be repaired, a thin colored coating may be applied over the texturized finish so as to form a continuous colored texturized finish over the entire surface of the now-repaired item completely masking the cracks and other imperfections in the surface thereof.

12 Claims, 5 Drawing Figures

METHOD FOR PROVIDING AUTOMOBILE DASHBOARDS AND THE LIKE WITH A TEXTURIZED FINISH

BACKGROUND OF THE INVENTION

1. Field of the Invention

The present invention relates to the field of plastic repair methods, and more specifically, to a method for repairing damage in plastic or leather-like fabrics, such as those found in automobiles.

2. Prior Art

The need to repair a wide range of plastic materials is well recognized in the art. This need can be readily appreciated when one considers the various plastic components in a typical automobile. For example, the dashboard, seats, interior of the roof, and the door panels are typically made of a plastic material. In the past when one of the aforementioned items was damaged, it was not uncommon for the entire item to be removed from the car and a new one put in its place. However, the cost of such materials has increased rapidly along with the related labor expenses. In addition, the complexity of such items has also increased to the point where a typical dashboard in an automobile costs hundreds of dollars. Should such dashboard become damaged, such as, for example, by cutting or the effects of heat and cold, to replace the same may require substantial disassembly of the dashboard, as well as other components of the car in order to remove the dashboard and a new one put in its place. In such a situation a large repair bill is very likely in order to repair seemingly minor damage. This has lead a substantial number of people to forego repairing of the dashboard and similar items or to repair the same only when covered by insurance or the like. Such damaged dashboards reduces the overall value of the car.

Because of the expense of replacing these types of plastic items, the prior art has evolved methods for repairing the same. Even in those prior art methods which were adapted to repairing such items, one always could tell whether the item had been repaired. This is unacceptable to many people.

The prior art methods for repairing dashboards generally fell into one of two categories. The first was the use of a heat process in which the exterior skin is heated so as to make the same flexible. A variety of patches can then be applied to the surface thereof in such a manner as to cover the damaged area. While this is the most popular method of repairing the various interior elements of a car, it has only met with limited success and even then, only when the area to be repaired is extremely small. If the area is relatively large, which most are, then one can easily discern where the patch has been applied. This is especially true in view of the fact that almost all interior plastic members of an automobile have a texturized finish which cannot be repaired without the same being very visible. Of course, if only an extremely small area is involved, then it is very likely that the same will go unnoticed. As pointed out hereinabove, if the area is large, then the likelihood of it being noticed increases substantially.

A second method which is also used, involves a filler which is applied to the hole or crack so as to fill in that area. While this type of repair is somewhat weaker than the heat repair method, it is more visible since it leaves a smooth spot with no texture or grain. Thus, while the prior art has recognized the need for a method of repairing the internal elements of a car, the problem has either been solved by the use of a hot method which created a repair which was very visible, or a cold method which was easily detectable.

The present method overcomes the problems with the prior art and provides a method for repairing dashboards, door panels and the like which is straight forward and renders the repaired surface substantially like new so that the area repaired cannot be identified. In other words, the present method provides the user with a means for repairing even very large cracks and other damaged areas to the interior of an automobile in such a manner that a texturized finish is produced which is pleasing to passengers in the car and which completely covers the originally damaged area such that the same cannot be identified after the repair work is completed.

BRIEF SUMMARY OF THE INVENTION

The present invention relates to plastic repair methods, and more specifically, to methods for repairing cracks and cuts in automobile dashboards and the like. Such type of items are not easily repaired in view of the fact that they are typically made of a flexible plastic or resin skin stretched over a semi-rigid polyurethane foam core. Given the use of a plurality of different materials, the method for repairing a dashboard is not straight forward as would be the case with repairing an automobile tire or other item made of a unitary material. The method comprises the steps of first depressing the skin and the foam core in an area around each of the respective cracks and/or cuts, and the like to be repaired so as to form an area which can be filled in. Next, the cracks and cuts are filled in with a hardenable filler, such as an epoxy resin and the like, which is then sanded down to match the original contours of the item to be repaired. A base coat of an acrylic resin lacquer is then applied over the entire surface to be repaired followed by a texturized acrylic resin coating which forms a texturized finish over the areas that have been repaired, as well as the original finish. In this manner, a continuous texturized finish is achieved such that one cannot distinguish those areas that have been repaired from the remaining portions of the specific article.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DETAILED DESCRIPTION OF THE INVENTION

Figure 1:
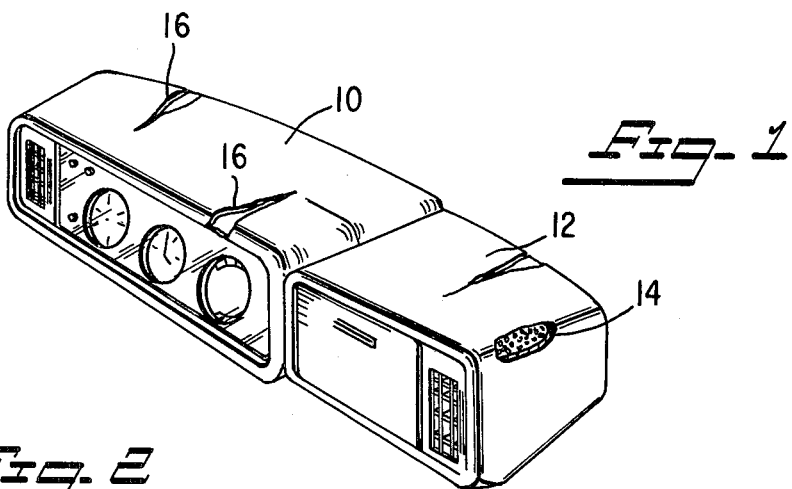
FIG. 1 is a perspective view showing a typical automobile dashboard with various cracks and cuts on the surface thereof.

Referring first to FIG. 1, there is shown a typical automobile dashboard 10 having an exterior skin 12 and a foam core 14. Such type of dashboards take on a variety of contours in order that various instrument panels, and the like, may be disposed therein. It has been found that various safety advantages are achieved when the dashboard is made semi-rigid such that should one be involved in an accident, hitting the dashboard will not cause damage as it has a tendency to give. However, in order to support the various components on the dashboard, it has been found that a substantial degree of rigidity is necessary. To achieve this balance of properties, a typical automobile dashboard has a semi-rigid polyurethane foam core covered with an acrylonitrile-butadiene-styrene (ABS) elastomer skin. Of course, other various types of plastic skins, such as vinyls and the like are also within the scope of this invention. The plastic skin 12 and foam core 14, while being able to withstand substantial impacts, do have a tendency to crack because of the interaction of the sun on the skin 12, as well as the foam core 14. In addition to the deleterious effects of the sun, such dashboards 10 can of course be cut with a knife or other sharp implement. The problems with cuts in the skin 12 which extend down to the form core 14, is that the ends of the skin adjacent the cut 16 have a tendency to bend upward, thus rendering the repair of such cut substantially more difficult. As discussed hereinabove, in the prior art method such upturned ends were flattened by heat or were merely filled in and sanded flat, both of which produced a highly visible repair. The present method achieves the necessary degree of rigidity and strength but does it in a manner which is not visible.

Figure 2:
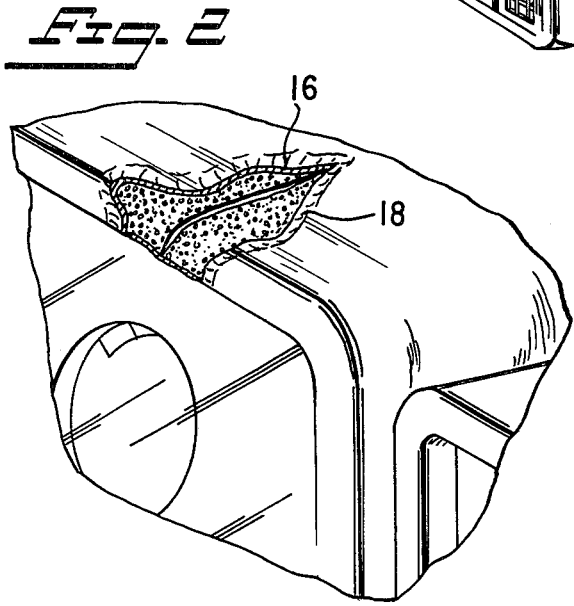
FIG. 2 is a perspective view of an automobile dashboard showing a typical cut with a depression formed adjacent the cut area.

As shown in FIG. 2, the first step of the method of the present invention is to heat and depress the skin 12 and core 14 adjacent the crack 16 so as to form a depressed area 18. This is achieved merely by using a "hot air gun" and heating the surface sufficiently so that the depression 18 can be formed. However, the subject to this step is to form a depressed area in order to level off the otherwise upturned ends of the skin 12 adjacent the cut 16. Thus, if the skin 12 or foam core 14 are made of materials which are too brittle to be heated and then reformed, the area is trimmed with a knife or the like so as to form a depression 18.

Figure 3:
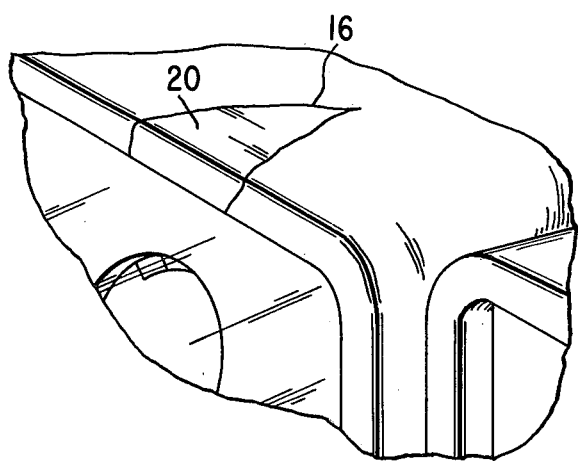
FIG. 3 is a perspective view of a typical automobile dashboard showing a cut which has been filled in with a resinous filler.

Referring now to FIG. 3, a resinous filler 20 has been disposed into the crack 16 and the depressed area 18 so as to fill the same. This is typically done by using an epoxy resin composition which is spread with a palette knife and when dry and, is sanded so as to match the original contour of the dashboard or other repaired item. While a variety of two-part epoxy resins can be used, it has been found that the preferred epoxy resin is one which cures under room temperature and includes a polyamine hardener with various inert fillers, some of which include spherical microballons. Such type of composition has been found to produce a readily sandable surface and one which can easily be shaped so as to match the original contour of the dashboard, and the like. Such type of resinous fillers are well known in the art and will not be discussed in detail herein.

After the filler 20 has been sanded off so as to match the original contour, an initial base coat of an acrylic resin lacquer is painted or otherwise coated on the entire skin 12 so as to enable the texturized coating, as hereinafter described, to readily coat the skin 12. Such acrylic lacquers are extremely well known in the art and will not be described in detail herein. It has been found that the use of an acrylic resin provides depth for the texturized coating, aids in the binding of the texturized coating to the item to be repaired and, depending on the specific lacquer used, governs the texturized finish in terms of the size of the grain. However, in some applications the base coat 24 may be omitted.

Figure 4:
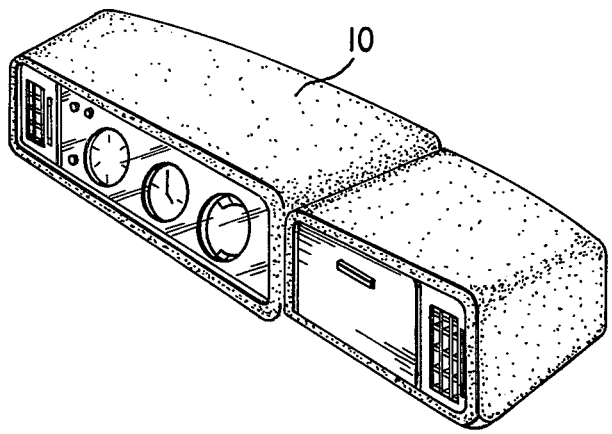
FIG. 4 is a automobile dashboard which has been repaired pursuant to the method of the present invention.
Figure 5:
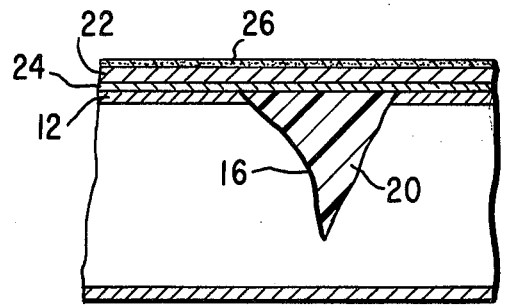
FIG. 5 is an enlarged view of a repaired cut showing the various coatings that have been applied to the dashboard on top of the now-repaired cut.

Referring now to FIGS. 4 and 5, one can see the now-repaired dashboard 10 which has a texturized coating extending over the entire surface thereof. Referring to FIG. 5, one can see that after the initial base coat 24 is coated over the skin 12, the next coating to be applied is the texturized acrylic coating 22. It has been found that the preferred texturized coating has the following chemical analysis:

| | |
|---|---|
| Volatile solvent | 84.7% wt |
| Nonvolatiles | 15.3% wt |
| | 100.0% wt |
| Volatile Solvent Composition: | |
| Acetone | 39.5% Vol |
| Isopropyl acetate | 14.9% Vol |
| Toluene | 34.9% Vol |
| Xylene | 10.7% Vol |
| | 100.0% Vol |
| Non Volatile Composition: | |
| Colloidal Silica | 23.4% wt |
| Polymethylmethacrylate | 76.6% wt |
| Final Composition: | |
| Polymethylmethacrylate | 10.7% wt |
| Colloidal Silica | 4.6% wt |
| Acetone | 31.5% wt |
| Isopropyl acetate | 13.1% wt |
| Toluene | 30.7% wt |
| Xylene | 9.4% wt |
| | 100.0% wt |

The above composition has a transluscent white appearance and is readily flowable.

As the paint begins to separate or "flake" it leaves a grain or texture which varies in depth according to how much base coat and/or lacquer is applied. Of course, other types of texture finishing paints have been used, such as wrinkle finishing, hammertones, and the like, depending on the type of texture ultimately desired. However, the preferred embodiment utilizes the texture producing acrylic paint.

While a variety of color texturized coating acrylic resins are available, it has been found in the preferred embodiment that a separate and discreet coating 26, which is yet another thin coating of a acrylic resin containing various dyes or organic pigments, produces exceptionally goods results. Such additional coating, because it is relatively thin, does not fill in the texturized coating achieved by the texturized paint coating 22. In this manner, a variety of colors can be achieved without the need for varying the color of the texturized coating 22.

The term "acrylic resins" as used herein, is extremely well known in the art. The term acrylic is meant to cover not only the polymers and resins made from acrylic esters, but also includes polymerizible derivatives of both acrylic and methacrylic acids, as well as the acid chlorides, nitriles, and amides. Such types of resins are known to produce extremely hard finishes and can be modified with a variety of pigments and plasticizers. Such type of texturized paints thus include a conventional transparent film-forming vehicle such as a chemically reactive or heat reactive vehicle, a nitrocellulose lacquer, or an acrylic alkyd. Of course, suitable solvents and/or diluents for the respective vehicle selected would be used. Such type of solvents include the well known aromatic hydrocarbons, and alcohols. In terms of pigments, many types of aluminum pigments are within the scope of this invention, as well as silica particles, and the pearlescent agents, such as Pearl Afflair NF-104-D manufactured by E. I. DuPont Nemours & Company. This material comprises platelets of mica coated with titanium dioxide. Other acrylic coatings, such as those containing 80 to 100 weight percent of polymerized methyl methacrylate and any balance of the polymer being mono ethylenically unsaturated monomer copolymerizible with methyl methacrylate such as other alkyl esters of acrylic or methacrylic acid illustrated by butyl acrylate are also within the scope of this invention. While acrylic polymers of the type used in automotive finishes are particularly preferred in this invention, other lacquer, or coating polymer systems, or enamels may be utilized whether clear or pigmented.

Other well known pigments which are also within the scope of this invention include carbon black, phthalocynanine green, phthalocynanine blue, red iron oxide iron blue, chromium tetrahydrate, lead chromate, and the like, as well as a wide variety of other metal flakes such as silver, copper, gold, tin, nickel, chromium, platinum, and alloys of the foregoing.

It should therefore be apparent to one skilled in the art that other changes and modifications can be made without departing from the spirit and scope of the present invention as defined and claimed herein. For example, the present method can be used to repair cuts in real leather, and can be used on a metal surface when a texturized finish is desired.

What is claimed is:

1. A method for repairing automobile dashboards and like plastic items having a texturized surface so as to provide the repaired areas with a surface substantially identical in appearance to the original surface, comprising the steps of:
    (a) filling in cracks and other indentations with a resinous filler such that a smooth surface is formed;
    (b) applying a base coat of an acrylic resin lacquer over the area having the now-filled cracks and indentations;
    (c) applying a texturize-producing resin coating over said base coat so as to form a texturized finish on the repaired area which is substantially identical in texture to the surface of the item being repaired; and
    (d) applying a thin coating having a coloring agent over said texturized finish so as to form a continuous colored texturized finish over the entire surface including said cracks and indentations.

2. A method according to claim 1 wherein said hardenable resinous filler comrpises an epoxy resin.

3. A method according to claim 1 wherein said resinous filler is sanded prior to the application of said base coat.

4. A method for repairing cracks and cuts in automobile dashboards and like items having a flexible plastic skin and a semi-rigid foam core comprising the steps of:
    (a) depressing said skin and said foam core in an area surrounding each said crack and cut so as to form an area which can be filled in;
    (b) filling in said cracks and cuts and said area surrounding the same with a hardenable resinous filler;
    (c) smoothing said resinous filler so as to match the original contour of said item to be repaired;
    (d) applying a base coat of an acrylic resin lacquer over the area having the now-filled cracks and cuts; and
    (e) applying a texturize-producing resin coating over said base coat so as to form a texturized finish on the repaired area which is substantially identical in texture to the surface of the item being repaired.

5. A method according to claim 4 wherein said hardenable resinous filler comprises an epoxy resin.

6. A method according to claim 4 wherein said method includes the step of:
    (f) applying a thin coating having a coloring agent over said texturized finish so as to form a continuous texturized finish of a predetermined color on said skin.

7. A method for repairing automobile dashboards and like flexible plastic surfaces having a texturized surface so as to provide the repaired area with a surface substantially identical in texture to the original surface, comprising the steps of:
    (a) filling in cracks and other indentations in said plastic surface with a resinous filler such that a smooth surface is formed;
    (b) applying a texturized producing acrylic resin coating over the area having the now-filled cracks and indentations so as to form a texturized finish on the repaired area which is substantially identical in texture to the surface of the item being repaired, said texturize-producing acrylic resin coating comprising polymethylmethacrylate in a solvent mixture of isopropyl acetate, toluene, acetone and xylene; and
    (c) applying a thin coating having a coloring agent over said texturized finish so as to form a continuous colored texturized finish over the entire surface including said cracks and indentations.

8. A method according to claim 7 wherein said texturized acrylic resin coating comprises:
about
10.7 wt % polymethylmethacrylate,
4.6 wt % colloidal silica,
21.5 wt % acetone,
13.1 wt % isopropyl acetate,
30.7 wt % toluene, and
9.4 wt % xylene.

9. A method according to claim 7 wherein said resinous filler comprises an epoxy resin.

10. A method according to claim 7 wherein said resinous filler is sanded prior to the application of said texturized acrylic resin coating in step (b).

11. A method according to claim 7 wherein said coloring agent is selected from the group consisting of pigments, dyes, and mixtures thereof.

12. A method according to claim 1 wherein said texturize-producing acrylic resin comprises a solution of polymethylmethacrylate.

* * * * *